Patented Sept. 7, 1926.

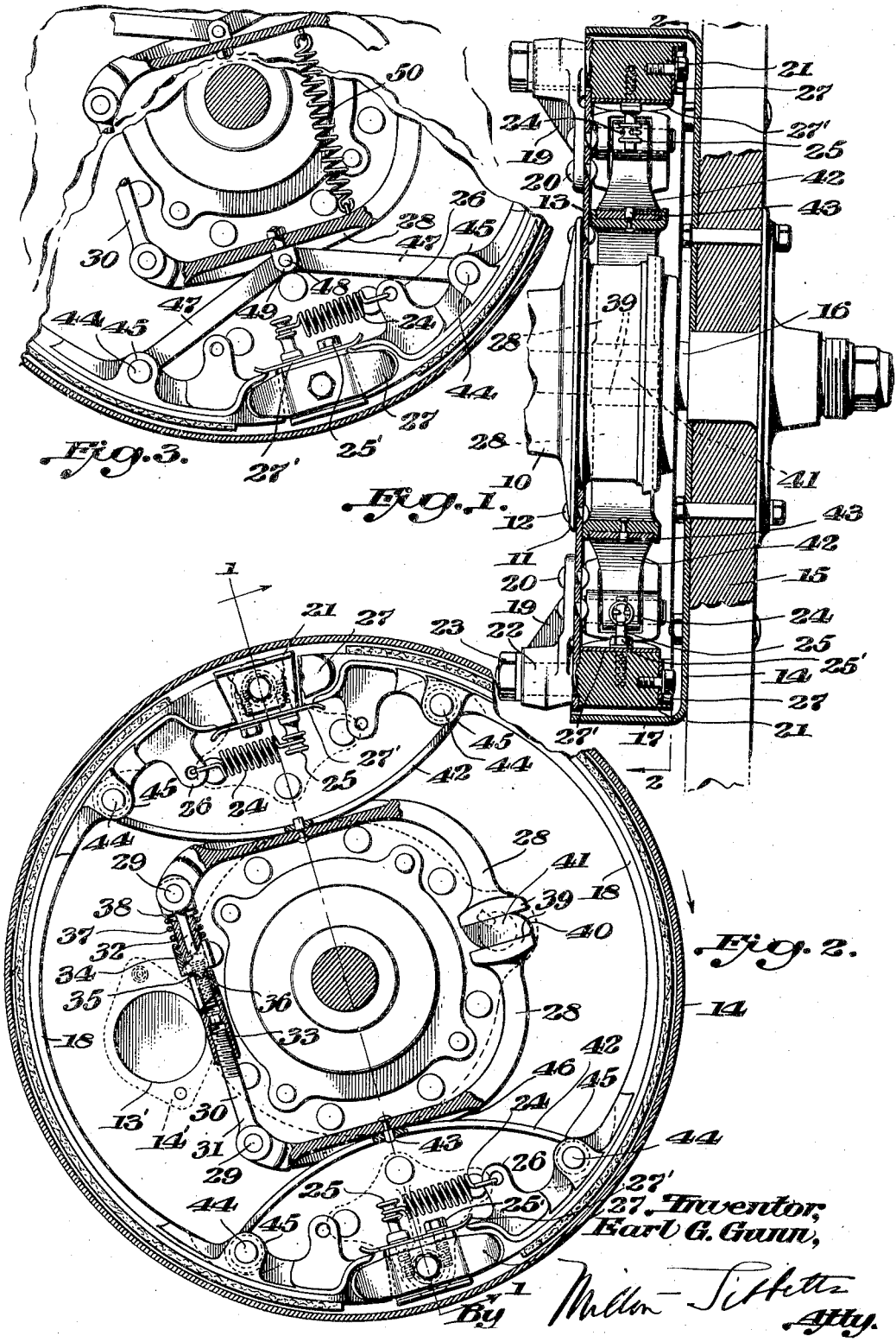

1,598,774

UNITED STATES PATENT OFFICE.

EARL G. GUNN, OF DETROIT, MICHIGAN, ASSIGNOR TO PACKARD MOTOR CAR COMPANY, OF DETROIT, MICHIGAN, A CORPORATION OF MICHIGAN.

BRAKE FOR MOTOR VEHICLES.

Application filed February 7, 1920. Serial No. 356,904.

This invention relates to motor vehicles and more particularly to brake mechanism for such vehicles.

One common type of brake mechanism in general use on motor vehicles utilizes a brake drum secured to a moving part of the vehicle as the vehicle wheel and expansible members carried by a stationary part of the vehicle such as the axle. The expansible members or brake shoes are usually pivoted or otherwise secured to the stationary support and are expanded or forced outward against the brake drum. Any number of these expansible members may be used but, assuming that two brake shoes are employed, it has been found that the ordinary actuating means for the shoes does not operate in a manner to apply equal pressure to both of the shoes and because of this the brake shoes do not efficiently perform their respective functions. It has also been found that the shoes do not act equally on the brake drum but that one shoe effects most of the braking action when the vehicle and drum are moving in one direction and that the other shoe effects the braking action when the vehicle and drum are reversed. This is due to the fact that one of the shoes tends to unwrap from the drum and the other to wrap on the drum and resist the rotation and therefore to brake the movement thereof.

The present invention has for its object to provide braking mechanism by means of which equal pressure may be applied to and transmitted by all of the braking elements or segments.

Another object of the invention is to provide a construction in which the expansible elements are floatingly mounted on the axle and are thereby free to accommodate themselves to the surface of the brake drum.

Another object of the invention is to provide a construction by means of which the brake acts on the drum equally at all points.

Another object of the invention is to provide a construction in which all the braking elements act equally well in both directions of rotation of the brake drum.

Another object of the invention is to provide, in a brake employing a plurality of brake shoes, means whereby the braking action of all the shoes is substantially uniform in both forward and reverse directions of movement of the vehicle and brake drum.

Another object of the invention is to provide in brake mechanism means for eliminating noise, thereby providing a quietly operating mechanism.

Another object of the invention is to provide for the adjustment of the movable or expanding braking elements whereby the normal positions of these elements with respect to the stationary element or brake drum may be varied.

Further objects of the invention will appear from the following description taken in connection with the drawings, in which:

Figure 1 is a sectional view of a brake mechanism made in accordance with my invention, this view being taken on line 1—1 of Figure 2;

Figure 2 is a sectional view taken at right angles to Figure 1 and substantially on line 2—2 of Figure 1, and Figure 3 is a detail sectional view, partly broken away, illustrating another form of the invention.

Referring to the drawings, a portion of the axle casing or tube 10 has been shown, this tube having an outwardly extending flange 11 to which is connected by suitable securing means 12 a supporting member or plate 13 upon which are mounted the movable elements of the braking mechanism as will hereinafter be more fully described.

A brake drum 14 is secured to the wheel 15 which is carried by an axle section 16, the latter being mounted in the usual manner in the axle casing. The drum 14 is provided with the usual inwardly extending flange 17 within which the movable braking elements or brake shoes 18 are mounted. In the form shown there are two of the brake shoes 18 and they are floatingly mounted and are adapted to have a limited movement in both directions of rotation of the brake drum and means is provided for retaining the shoes in position and against undue lateral movement, means also being provided for normally and yieldingly retaining the shoes in engagement with abutments or anchor blocks.

The supporting plate 13 has secured thereto a pair of brackets 19, these brackets being riveted to the plate as shown at 20 and forming the supports for one or more anchor blocks or abutments 21, there being two such blocks in the embodiment of the invention illustrated. These abutments have formed thereon or secured thereto outwardly extending bolts 22 which project through the plate 13 and through suitable apertures in the brackets 19 and are secured against movement by means of nuts 23.

As stated above, the brake shoes are loosely mounted within the brake drum 14, these shoes being disposed on the opposite sides of the two abutments or anchor blocks 21 as clearly illustrated in Figure 2. In view of the fact that the brake shoes are not pivoted or otherwise positively connected to the supporting plate 13, it will be evident that when the vehicle is moving and, therefore, the brake drum 14 is rotating and the pressure is applied to brake shoes, the shoes will engage the drum and will move with the brake drum to a limited extent or until they engage the abutments 21. As the brake is more often used when the vehicle is moving forwardly means has been provided for normally retaining the ends of the shoes in engagement with one side of the abutments, since the movement of the shoes against the anchor blocks causes a clicking noise and thereby detracts from the quiet operation of the mechanism. This means has been illustrated in detail in Figure 2 and comprises a spring 24 carried by each of the abutments 21 and engaging at one end a post 25 which is screw threaded into the abutment and at its opposite end each spring engages an offset or inwardly extending lug 26 formed on or secured to the brake shoe. Assuming that the brake drum rotates in the direction of the arrow shown in Figure 2 when the car is moving forwardly, it will be seen that each spring 24 normally retains the end of the brake shoe to which it is connected in engagement with the abutment 21, thereby preventing initial movement of the brake shoe when the brakes are thrown on and preventing the clicking noise which would be occasioned by this end of the brake shoe engaging the abutment.

Means has also been provided for preventing undue lateral movement of the brake shoes with respect to the supporting plate 13, this means comprising a pair of resilient or spring plates 27 which are secured to the blocks 21 and engage the ends of the brake shoes tending to force the shoes in a direction toward the supporting plate. Resilient plates 27' are also secured to blocks 21 by posts 25 and screws 25' and these plates guide the shoes 18 in their endwise movement. These resilient members 27 and 27', as well as the springs 24, also tend to obviate any rattling of the movable brake mechanism or brake shoes.

The means for applying pressure to the brake shoes will now be described.

A pair of arms 28 are pivoted as shown at 29 to a link 30, this link being sectional and comprising a pair of members 31 and 32. The members 31 and 32 are screw threaded at their free ends, one of the members being provided with a right hand screw thread and the other with a left hand screw thread. The screw threaded free ends of the members 31 and 32 are engaged by a sleeve 33 which is also provided with right hand and left hand threads at its opposite ends and it will readily be seen that by turning the member 33, the sections 31 and 32 will be drawn toward each other or forced away from each other. Means is provided for yieldingly retaining the sleeve 33 in adjusted position, this means comprising a slidable sleeve 34, which is mounted on the section 32 and is free to slide thereon, but is prevented from turning with respect thereto and this member 34 is provided with a lug 35 which is adapted to engage a notch 36 formed in one end of the sleeve 33. A spring 37 engages a shoulder 38 formed on the section 32 and one end of the sleeve 34 thereby forcing the sleeve in a direction toward the sleeve 33 and yieldingly retaining the lug 35 in the notch 36 formed on the sleeve 33. In order to facilitate the adjustment of sleeve 33 an opening 13' is made in plate 13 and a cap 14' covers the opening.

From the above description it will be evident that as the sleeve 33 is rotated the pivots 29 of the arms 28 will be drawn toward each other or forced away from each other. At their free ends the arms 28 are provided with enlarged portions 39 which are engaged by a cam 40 mounted on a cam shaft 41, the cam shaft being operated in any suitable manner.

Means have been provided for transmitting the movement of the arms 28 to the brake shoes in such a manner that equal pressure will be applied to each of the shoes. As shown in the embodiment of the invention illustrated in Figure 2, this connecting means comprises bow springs 42 each of which is connected at substantially its longitudinal center by a pin 43 to one of the arms 28 and at its free ends is pivotally connected, as shown at 44, to outwardly extending alined lugs 45 formed on or secured to the brake shoes. The arms 28 are provided with channeled portions 46 in which the bow springs 42 are mounted, the flanges on the channeled portions preventing lateral movement of the springs and assisting the pins 43 in maintaining the springs in position.

The form of the invention just described operates as follows: Assuming that the drum is rotating in the direction of the arrow In Figure 2, when the cam shaft 41 is rotated the cam 40 engages the ends of the arms 28 and forces these arms outwardly and after these arms are so actuated the pressure is transmitted through the bow springs 42 to the ends of the brake shoes thereby applying pressure to each of the brake shoes. In view of the floating mounting of the shoes with respect to the supporting member and anchor blocks or abutments, when pressure is applied to the shoes they will engage and move with the drum to a limited extent and this movement is limited by the engagement of the shoes with the anchor blocks. The shoes after this limited rotational movement will transmit the pressure to the brake drum and this pressure will be substantially evenly distributed around the inner surface of the drum. When the cam has been returned to its normal position the springs 42 also assume their normal position and in returning to normal position force the arms 28 to their initial position. By adjusting the sleeve 33, the pivots 29 may be moved toward or away from each other thereby varying the distance between the ends of the arms 28.

The form of the invention illustrated in Figure 3 is very similar to that shown in Figure 2, except that the bow springs 42 are not used but a pair of links 47 is substituted for each of the bow springs, these links being pivoted to lugs 45 formed on the brake shoes and at their opposite ends being connected by a common pivot 48 to a pair of lugs 49 projecting outwardly from and secured to the arms 28. In this form of the invention a spring 50 is secured at its opposite ends to the arms 28 and assists in returning these arms to their initial position after the cam has been returned to its initial position. The remaining structure of the form of the invention shown in Figure 3 is exactly the same as that shown in Figures 1 and 2 and, therefore, this structure has not been illustrated in Figure 3.

The operation of the structure shown in Figure 3 is substantially the same as that shown in Figure 2 and need not be described in detail.

From the above description it will be seen that I have provided a simple and efficient means for applying and transmitting equal pressure to each of the braking elements or brake shoes and moreover a construction in which unnecessary noise has been eliminated and which may be adjusted to vary the normal positions of the actuating means.

While certain specific embodiments of the invention have been illustrated and described, it should be understood that the invention is capable of further modification and that further modifications and changes in the construction and in the arrangement of the cooperating parts may be made without departing from the spirit or scope of the invention as expressed in the following claims.

What I claim and desire to secure by Letters Patent is:

1. Brake mechanism including in combination, a brake drum, a plurality of expansible braking elements adapted to engage said drum, an abutment between adjacent ends of the braking elements, and means including a resilient connecting member for applying equal pressure to said elements.

2. Brake mechanism including in combination, a brake drum, a plurality of expansible braking elements adapted to engage said drum, an abutment between adjacent ends of the braking elements, and means including a resilient member connected to said elements for applying equal pressure to said elements.

3. Brake mechanism including in combination, a brake drum, a plurality of expansible braking elements adapted to engage said drum, an abutment between adjacent ends of the braking elements, and means including a plurality of resilient connecting members for equalizing pressure on said elements.

4. Brake mechanism including in combination, a brake drum, a pair of loosely mounted brake shoes, an abutment between adjacent ends of the shoes, and means including a pair of resilient members connected to said shoes for applying pressure to each shoe.

5. Brake mechanism including in combination, a brake drum, a pair of loosely mounted brake shoes, abutments between adjacent ends of the shoes, and means including a bow spring connected to said shoes for applying equal pressure to said shoes.

6. Brake mechanism including a drum, brake shoes adapted to engage the drum and actuating mechanism for said shoes including a link, a pair of arms pivoted to said link, actuating means for said arms, and resilient means connecting said arms to said shoes.

7. Brake mechanism including a drum, a plurality of brake shoes adapted to engage said drum and actuating means for said shoes including an adjustable link, a pair of arms pivoted to said link adjacent the opposite ends thereof, actuating means for said arms, and resilient means connecting said arms to said shoes.

8. Brake mechanism including a drum, a pair of brake shoes mounted therein and adapted to engage said drum, abutments between adjacent ends of said shoes, a pair of bow springs connected to each of said shoes, and means for applying pressure to said springs.

9. Brake mechanism including a drum, a pair of brake shoes mounted therein and adapted to engage said drum, abutments between adjacent ends of said shoes, a bow spring pivotally connected to each of said shoes, and means for applying pressure to said springs substantially at the longitudinal center thereof.

10. Brake mechanism including a drum, a pair of brake shoes mounted therein and adapted to engage said drum, abutments between adjacent ends of said shoes, a pair of bow springs, each of said springs being pivotally connected to each of said brake shoes, and means for applying pressure to said springs.

11. Brake mechanism including a drum, a plurality of brake shoes floatingly mounted therein and resilient means connected to said shoes substantially at the ends thereof for applying equal pressure to said shoes.

12. Brake mechanism including a support, abutments carried thereby, a drum, brake shoes mounted within said drum, and means normally tending to retain said shoes in contact with said abutments.

13. Brake mechanism including a support, an abutment carried thereby, a drum, a brake shoe loosely mounted on said support, and resilient means connected to said support and said shoe for normally retaining said shoe in contact with said abutment.

14. Brake mechanism including in combination, a supporting member, an abutment carried thereby, a brake shoe floatingly mounted on said supporting member and adapted to engage said abutment, and resilient means for applying pressure to said brake shoe.

15. Brake mechanism including a support, a drum, a plurality of brake shoes floatingly mounted within said drum, and yieldable means engaging said shoes for preventing lateral movement of said shoes with respect to said support.

16. Brake mechanism including a support, a drum, a plurality of brake shoes floatingly mounted within said drum, and yieldable means engaging a plurality of said shoes for preventing lateral movement of said shoes with respect to said support.

17. Brake mechanism including a support, a block carried thereby, a drum, brake shoes mounted within said drum, and yieldable means rigidly carried by said block and engaging said shoes for preventing lateral movement of said shoes with respect to said support.

18. Brake mechanism including a support, a block carried thereby, a drum, brake shoes mounted within said drum, and yielding means rigidly carried by said block and engaging said shoes for preventing lateral movement of said shoes with respect to said support.

19. In a brake mechanism, the combination with a rotatable brake drum, of a brake supporting means, a brake shoe supported thereby and adapted to have a limited rotational movement with the brake drum in either direction, and yielding means normally retaining said shoe at one limit of its rotational movement.

20. In a brake mechanism, the combination with a rotatable brake drum, of a brake supporting means, a brake shoe supported thereby and adapted to have a limited rotational movement with the brake drum in either direction, and yielding means for normally retaining the shoe at the limit of its rotational movement when rotatng in its forward direction.

21. In a brake mechanism, the combination with a rotatable brake drum, of a brake supporting means, a brake shoe supported thereby and adapted to have a limited movement with the brake drum in either direction, and yielding means for guiding said shoe in its movement with the brake drum.

22. In a brake mechanism, the combination with a rotatable brake drum, of a brake supporting means, a brake shoe supported thereby and adapted to have a limited movement with the brake drum in either direction, and a plurality of yielding means for guiding said shoe in its movement with the brake drum.

23. Brake mechanism including in combination, a rotatable brake drum, a plurality of floatingly mounted brake shoes adapted to have limited rotational movement with said drum, a supporting member, abutments carried by said member and disposed in the path of the rotational movement of said shoes, and means including equalizing springs for moving said shoes into engagement with said drum.

24. Brake mechanism including in combination, a supporting member, brake shoes loosely mounted thereon, a brake drum, abutments carried by said supporting member and disposed between said shoes, and means including equalizing springs for applying pressure to said shoes at points adjacent the ends thereof.

25. Brake mechanism including in combination, a supporting member, abutments carried thereby, brake shoes loosely mounted on said member and adapted for endwise movement between said abutments, and means for applying equal pressure to said brake shoes.

26. Brake mechanism including in combination, a supporting member, abutments carried thereby, brake shoes loosely mounted on said supporting member and adapted for endwise movement between said abutments, and means including resilient members connected to said shoes adjacent their ends for applying equal pressure to said shoes.

27. Brake mechanism including in combination, a supporting member, abutments carried thereby, brake shoes loosely mounted on said supporting member, each shoe being disposed between two abutments, and means for applying equal pressure to said shoes at points on opposite sides of said abutments.

28. Brake mechanism including in combination, a supporting member, abutments carried thereby, brake shoes loosely mounted on said supporting member, each shoe being disposed between two abutments, and means including members connected to adjacent ends of successive shoes and at opposite sides of said abutments for applying equal pressure to said shoes.

29. In a motor vehicle, in combination, an axle, a supporting plate mounted thereon, a wheel having a brake drum surrounding said plate, a pair of brake shoes mounted in the same plane within the drum, and resilient means for laterally positioning the shoes relative to the supporting plate while permitting the shoes to be applied to the drum.

30. In a motor vehicle, in combination, an axle, a supporting plate mounted thereon, a wheel having a brake drum mounted adjacent said plate, a pair of brake shoes mounted in the same plane within said drum and carried by said supporting plate, and resilient means for laterally positioning the shoes relative to the supporting plate while permitting the shoes to be moved bodily relative to the resilient means in applying the shoes to the drum.

In testimony whereof I affix my signature.

EARL G. GUNN.